G. W. FERDON.
CONICAL STRAINING DEVICE.
APPLICATION FILED DEC. 10, 1919.
1,395,951.
Patented Nov. 1, 1921.
2 SHEETS—SHEET 2.
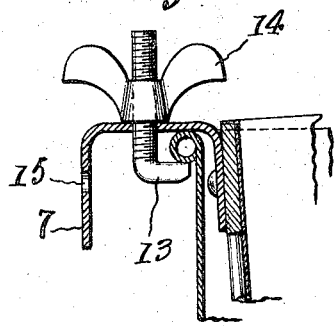
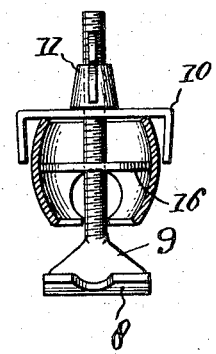
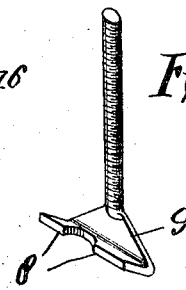
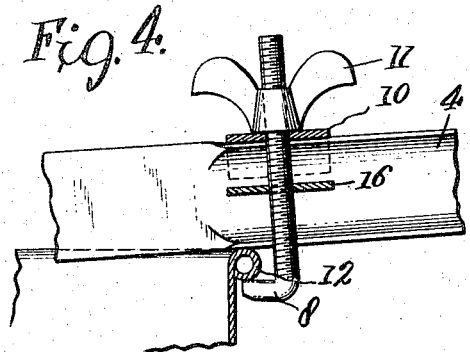
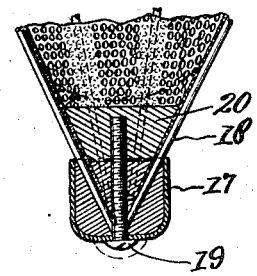
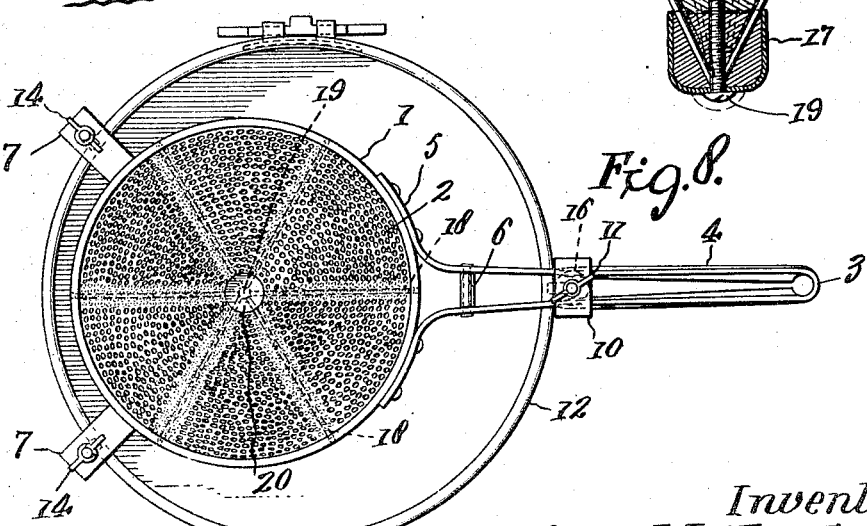
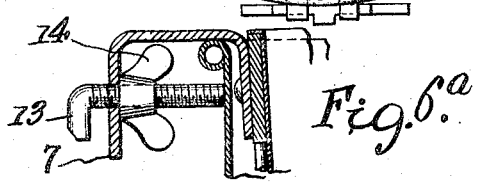
Inventor:
Guy W. Ferdon.
by Chas. C. Stauffer
Attorney.

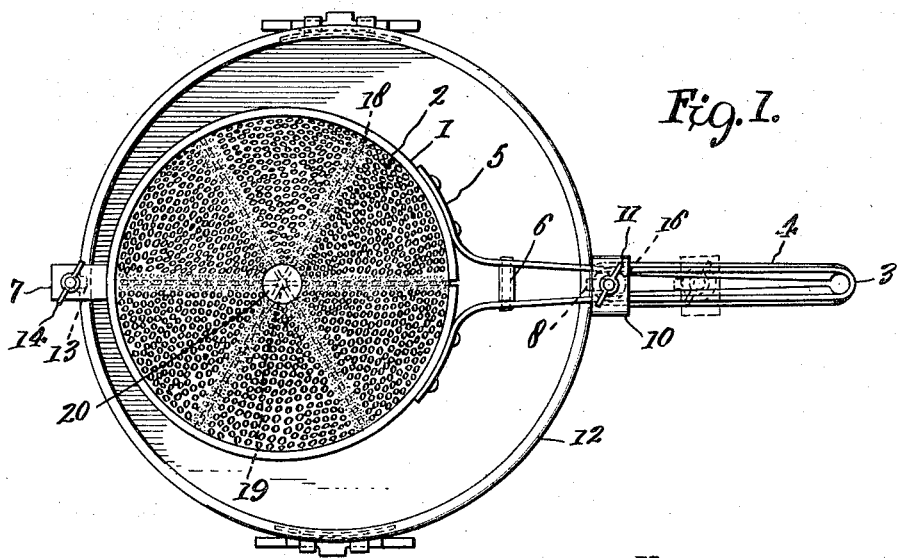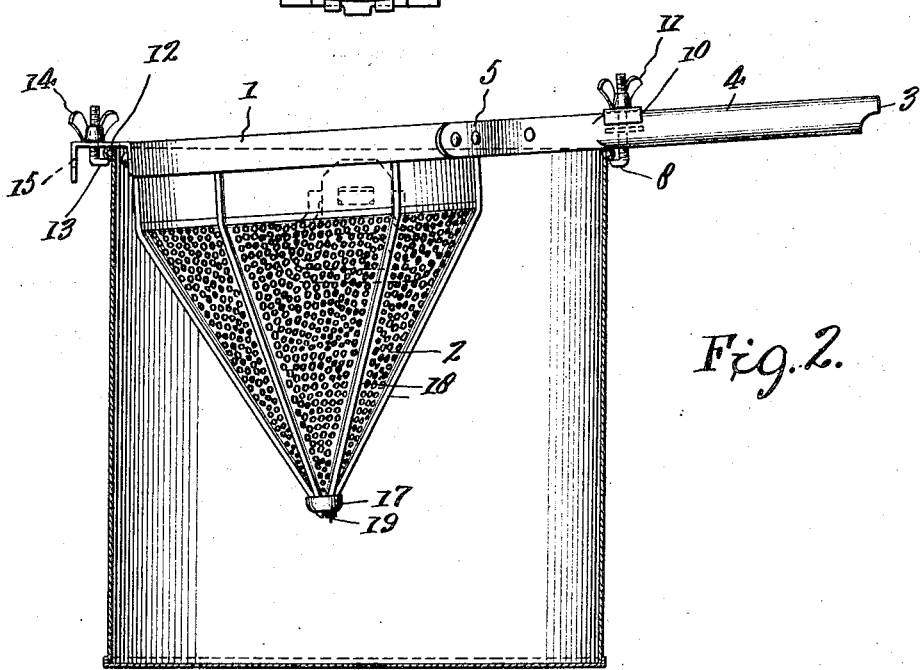

UNITED STATES PATENT OFFICE.

GUY W. FERDON, OF CRESSKILL, NEW JERSEY.

CONICAL STRAINING DEVICE.

1,395,951. Specification of Letters Patent. Patented Nov. 1, 1921.

Application filed December 10, 1919. Serial No. 343,704.

*To all whom it may concern:*

Be it known that I, GUY W. FERDON, a citizen of the United States, and a resident of Cresskill, in the county of Bergen and State of New Jersey, have invented certain new and useful Improvements in Conical Straining Devices, of which the following is a specification.

My invention relates to straining devices or strainers to be used in separating solids from liquids, as juices from fruit pits and stems, and also in preparing and straining various emulsions, such as paints, unguents, potters' slips, sauces, soups, etc., or other substances and combinations of the like character. My invention is particularly intended for use in hotel and club kitchens and other places where food is prepared in considerable quantities and served in frequent orders or otherwise. Sometimes a strainer may be used to strain different materials in turn, sometimes it may be kept in one position and used for one material for hours, the strained liquid being removed from a pot below at intervals as desired. It is useful in securing removal of bones, scraps, etc., from soups or soup stock, for smoothing and straining sauces, and for similar purposes. My device is especially intended for the use of chefs who are particular in the preparation of soups, sauces, dressings, etc., which they desire to be free from lumps or foreign particles of any kind. Strainers for this purpose, sometimes called Chinese strainers or conical strainers, are in use in all hotels and clubs and my device is an improvement upon those already existing. Such strainers usually have a heavy frame at the top to which a handle is secured and on the side opposite the handle is also secured an outstanding arm or claw, the object being to provide means whereby the strainer may be rested upon the top of a kettle, pot or other receptacle and the food, say for instance soup, with the bones, vegetables and other material mingled with it is put into the strainer and rubbed or forced through either by means of a spoon or other implement, or if the temperature permits, by using merely the fingers. Such utensils are subject to frequent and very rough use in kitchens or other places, such as has been indicated. When the user is through with one of these articles he raps the bottom on some solid object and then the top in order to get rid of the detained particles, rinses the implement off under a water spigot or swirl it around in a pan of water and throws it back on the tool table or hangs it up. The implement should be able to withstand the pressure incident to the exertions of a strong-armed man and the battering and abuse which it meets on being thrown around or in use.

Another objection to the devices now in use is this. The temperature to which they are subjected through carelessness or inattention is sometimes quite high and as the parts are soldered together the solder is sometimes melted out by very hot grease, by grease catching fire, by exposure to naked flame or by other causes. Whenever the solder melts out the device is apt to come to pieces particularly at the bottom, and be worthless and useless until it is repaired.

In my device, while the parts are soldered together they are also secured in other ways, so that even if all the solder be melted out the parts of my device will be retained in place and may in an emergency even be used when the solder melts off around the wires and near the apex. In using a strainer of the ordinary kind, the cook has generally to hold it in place with one hand while he manipulates the contents with the other; this is unsatisfactory and awkward. One of the objects of my device is to provide means whereby the implement may be secured across the top of a kettle, leaving both hands of the cook free for manipulation of the presser or spoon or the placing of ingredients with one hand and use of the spoon or presser with the other hand.

The foregoing and other objects are accomplished by the device shown in the accompanying drawings, in which:—

Figure 1 is a plan view, and

Fig. 2 is a side view of my device mounted upon the top of a can.

Fig. 3 is a view showing the jaw used in the arm.

Fig. 4 is a view of the jaw used in the handle, showing part of the handle.

Fig. 5 is a cross section of the handle as shown in Fig. 4.

Fig. 6 is a detail showing the claw end of the arm jaw.

Fig. 6ª shows my arm clamping screw in horizontal position.

Fig. 7 is a section showing the bottom clamping device, and

Fig. 8 is a view showing my device provided with two arms instead of one.

In the drawing 1 represents the annular frame which is a frame ring or annulus of band iron, the ends being brought together. I may form a handle 3 from a similar piece of iron, bending it into an elongated U-shape and embossing the sides of the handle as indicated at 4, so as to make them rounded. The ends 5 of this handle may be riveted or otherwise secured to the annulus on each side of the joint and the arms are further held together by a cross bolt or rivet 6, which firmly holds the parts in place. In addition, the joints where the pin 6 passes may be reinforced by solder, as seen in Fig. 8. While I show said arms short, I may in fact extend them much farther than here shown. On the diametrically opposed side of this annulus I mount the arm 7, also riveted or otherwise secured to the annulus or frame, and this arm and the handle support the device on the top of a kettle, as shown clearly in Fig. 2. I secure to this ring or frame the strainer proper, which will be described later on. In the handle I mount a jaw 8 which is adjustable in the slot of the handle, as indicated by dotted lines in Fig. 1, and this jaw may be provided with a shoulder 9 which may abut against the lower edge of the vertical slot in the handle, and on the top of the handle I prefer to mount a bridge piece 10. I provide a thumb nut 11 for the top of the jaw 8. This jaw passes through a perforation in the bridge piece. It will be seen that by turning the thumb nut, the jaw will be drawn up toward the bridge piece. If it is adjusted so as to take on a bead 12 of a kettle it will grip the bead and clamp it between the jaw and the handle. The handle and consequently the frame and kettle are thus held securely together. On the arm 7 I mount a jaw 13 similar to the jaw 8 and pass the screw-threaded portion through the hole in the arm 7. I also provide a thumb nut 14 whereby this jaw may be made to take on the bead of a kettle and assist in holding the strainer in position. I may also provide in the front or down-extending portion of said arm 7 a screw-threaded opening 15. My jaw 13 may be removed and screw-threaded through this opening, as shown in Fig. 6ª, to engage the vertical side of a can or kettle, particularly if the top of such can or kettle is not provided with a bead. The handle jaw is adjusted so that pressure thus exerted will hold the frame of my device against movement even when no bead is provided.

I may, as shown in Fig. 8, provide two of said arms 7, thus giving still greater stability. Of course more may be added. In the hollow of the handle, as shown in Fig. 5, I may provide a somewhat loosely fitting washer 16, the object of which is to assist in holding the jaw within the slot, that is, keep it from being shaken out or removed.

I prepare, to be mounted in the annular frame above described, a strainer proper 2. First I adapt to the frame thus described a series of wires 18 here shown as six in number and these may be attached either by inserting one end of each wire into a hole drilled in the said annulus 1 and upsetting it there or by soldering, brazing, or otherwise securing said wires in place. They might be made to enter holes drilled in the bottom of a thickened annulus frame. I also may possibly secure these wires 18 to the strainer proper first, and then unite them to the ring. The object and purpose will be accomplished whenever the said wires are firmly secured both to the ring 1 and to the top piece of my strainer part. These wires extend down a short distance and are then bent inward at an angle whereby they are brought as closely together as possible at a point. The strainer part proper consists in part of a cylinder shaped band 21 of sheet metal, such as tin, wider than the frame annulus, extending as far as the place where the wires are bent inward. This forms a brace then, for the wires at this point. To this piece of sheet metal I secure a piece or pieces of perforated sheet metal soldered together, soldering it to the upper piece of sheet metal and preferably soldering the said perforated sheet metal to the wires or rods throughout, or this perforated piece may be made of one continuous piece of metal integral throughout. This piece of perforated sheet metal is of course cone-shaped and forms the strainer proper or strainer piece, and it should be heavy enough to withstand rough usage. The sheet metal ring at the top may be brazed or soldered or otherwise secured to the iron frame ring and all the parts are preferably, though not necessarily, soldered or otherwise fixedly secured together. The wires at the bottom are brought as closely as possible, as aforesaid, to a point and over the wires thus brought together I place a cap 17 and I fill this cap with solder. I now drill through this cap and solder and the brought-together wires, vertically, a hole and tap or screw-thread the hole for engagement with a bolt or screw 19. The nut 20 which engages with said screw is placed inside the funnel or strainer and is shaped to fit and adapt itself finally to the inside of said strainer. If now the screw be turned and pressure be applied it will be seen that ends of the wires will be engaged and clamped between the cap 17, screw 19 and the nut 20. If now the solder escape by overheating it will be seen that the wires will still remain clamped in place notwithstanding the loss of the solder. After I have screwed home the screw above mentioned I prefer to solder over top and around the retaining plug or nut at the bottom of the strainer and also to put some solder around the head of the bolt or screw as indicated in dotted lines in Fig. 7. This is additional protection. The screw and nut just mentioned also serve as a knocking knob, particularly when supplied with solder, when the device is rapped on a table or block. The shock is thus distributed much more evenly then in those cases where no knocking knob is supplied. The joints between the wires and the strainer piece should be filled with solder so that particles of food may not lodge deleteriously within any small recesses formed between any of the perforations and the rods or wires back of them. The device, when in position, may have a slight cant or tilt as seen in Fig. 2 by reason of the handle side being held at a slightly higher elevation, as seen in the figure, due to height or thickness of the handle being greater than that of the arm. This construction in some instances facilitates draining or dripping from the strainer.

It will thus be seen that I have devised a strong, simple device, well adapted for the purpose in question; one which may be clamped in place and which may be adjusted to varying diameters and circumferences of kettles, up to the limit of the length of the handle, upon the top of the pot or kettle, etc., leaving both hands of the user free; one which when exposed to excessive heat is not liable to become so damaged that it cannot be used and one which will stand rough usage, enabling the cook or other user to squeeze and strain out the last traces of fluid from the mixture, thereby getting all the fluid and all the solid part separated.

As indicated above, while I have shown my device particularly intended for culinary use, it is well adapted for other uses, and I may use the device in many relations. I desire to cover the use of all equivalents of my device.

Having thus described my invention, what I claim as new and desire to secure by Letters Patent, is as follows:

1. In a strainer, in combination, a frame, supporting wires or rods secured to said frame, a bottom cap in which the ends of said wires meet and are secured, a clamping screw adapted to pass through a hole drilled through said cap and wires, a nut on the inside of the strainer engaging the screw whereby the wires are clamped between the nut and the cap, and perforated metal sheet material secured to said wires and frame, the bolt and nut serving as a knocking knob for the device.

2. In a strainer, in combination, a frame, supporting wires or rods secured to said frame, a bottom cap in which the ends of said wires meet, a hole being tapped through said cap and wires, a clamping screw adapted to pass through said tapped hole, a nut on the inside of the strainer engaging the screw whereby the wires are clamped between the nut and the cap, and a sheet of perforated metal inside said wires soldered at the top to said frame and at the sides to said wires, the bottom cap and the bottom of the strainer being soldered together.

3. In a strainer, in combination, an annular frame, wires secured at one end to said frame and brought together at the other end, thereby making a conical support, a strainer piece similarly shaped secured inside said wires and frame, said strainer piece having perforated sides and an imperforate annular top wider than the annular frame, said annular top also secured to said wires and to said annular frame, and means for securing the wires together at the bottom.

4. In a strainer in combination, an annular frame, wires secured at one end to said frame, being bent below the frame and brought together at the other end to form a cone, a top piece consisting of a top annulus adapted to fit inside the annular frame and extending below said annulus as far as the bends in the wires, a strainer piece secured to said top piece and to the wires, a cap fitting over the ends of the wires, a bolt passing vertically through said cap and wires, and a cone-shaped nut adapted to fit within the strainer and to be engaged by the bolt, the parts being all soldered together.

5. In a strainer, in combination, an annular frame, wires or rods secured to said frame at one end and brought closely together at the lower end to form a cone, a strainer piece secured to said annular frame and said wires, a handle secured to said frame, and an adjustable jaw on said handle, and adapted to be made to engage and hook under a bead at the top of a receptacle.

6. In a strainer, in combination, an annular frame, wires or rods secured to said frame at one end and brought together at the lower end to form a cone, an imperforate cylindrical top piece secured within the frame, a strainer piece secured to said top piece and wires, a handle secured to said frame, an arm secured to said frame angularly distant from said handle, and an adjustable device in the handle and arm each, whereby the frame may be clamped to the top of a pail or other receptacle.

7. In a strainer, in combination, an annular frame, wires or rods secured to said frame at one end and brought together at the lower end to form a cone, an imperforate cylindrical top piece secured within the frame, a strainer piece secured to said frame, a bent-over arm angularly removed from said handle and provided with an adjustable screw-threaded jaw, said arm and jaw provided with means whereby the jaw may be made to engage the under side of a bead at the top of a vessel or to engage upon the side of the vessel to assist in connection with handle in holding the strainer in position.

8. In a strainer, in combination, an annular frame, wires or rods secured to said frame at one end and brought together at the lower end to form a cone, an imperforate cylindrical top piece secured within the frame, a strainer piece secured to said top piece and wires, a handle secured to said frame, a bent-over arm angularly removed from said handle and provided with an adjustable jaw, said arm and jaw provided with means whereby the jaw may be made to engage the under side of a bead at the top of a vessel or to engage upon the side of the vessel, said handle being slotted and provided with a hooked jaw adjustable in said slot whereby the jaws may be made to clamp the frame upon the receptacle in position for culinary availability.

9. In a strainer for culinary use, in combination, an annular frame consisting of a piece of band iron bent into an annulus, a handle consisting of a piece of similar iron bent into the shape of an elongated U with flanges secured each side of the joint in the annulus, a jaw adjustable in the U-shaped handle, an arm opposite the handle, a jaw in said arm, and a strainer secured to said frame.

10. In a strainer, in combination, a frame consisting of a piece of band iron bent into a circle, a handle consisting of a piece of band iron bent into an elongated U-shape, with flanges extending each side the joint in the annulus, a bead-engaging jaw adjustable in the handle, an arm opposite the handle, and a bead-engaging jaw in said arm.

11. In a strainer, in combination, an annular frame, a handle secured to said frame, an arm opposite said handle, adjustable clamping means in said handle and arm, wires or rods secured to said frame, and brought together to make a cone, a cap for the ends of said wires, a screw tapped through said wires, a nut for said screw within said wires, and a strainer.

12. In a device of the character described, in combination, an annular band, an arm on one side of said band, a handle of greater thickness than the arm on the other side of the band, clamping means in both handle and arm, strainer supporting wires attached to said band and drawn together at the bottom, a bolt tapped into said wires, a nut and a cap in which said wires are put.

In testimony whereof I have hereunto affixed my signature.

GUY W. FERDON.